(12) United States Patent
Bimczok

(10) Patent No.: US 9,489,850 B2
(45) Date of Patent: Nov. 8, 2016

(54) METHOD FOR ENGINE TORQUE ADJUSTMENT

(75) Inventor: Eike Bimczok, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 165 days.

(21) Appl. No.: 13/547,233

(22) Filed: Jul. 12, 2012

(65) Prior Publication Data

US 2013/0018563 A1    Jan. 17, 2013

(30) Foreign Application Priority Data

Jul. 14, 2011 (DE) .................. 10 2011 079 149

(51) Int. Cl.
| | | |
|---|---|---|
| *G05D 17/00* | (2006.01) | |
| *G08G 1/16* | (2006.01) | |
| *B60W 50/08* | (2012.01) | |
| *B60K 31/00* | (2006.01) | |
| *B60W 10/06* | (2006.01) | |
| *B60W 30/06* | (2006.01) | |

(52) U.S. Cl.
CPC ........... *G08G 1/168* (2013.01); *B60K 31/0008* (2013.01); *B60W 50/087* (2013.01); *G08G 1/166* (2013.01); *B60W 10/06* (2013.01); *B60W 30/06* (2013.01); *B60W 2520/10* (2013.01); *B60W 2710/0666* (2013.01); *B60W 2710/0672* (2013.01)

(58) Field of Classification Search
USPC ............... 701/31.4, 37, 70, 80, 96, 98, 99
See application file for complete search history.

(56) References Cited

U.S. PATENT DOCUMENTS

| | | | |
|---|---|---|---|
| 7,127,337 B2 | 10/2006 | Bennett et al. | |
| 2004/0064231 A1* | 4/2004 | Oohori et al. ................. 701/54 |
| 2004/0262067 A1* | 12/2004 | Sawada et al. .............. 180/282 |
| 2005/0080523 A1* | 4/2005 | Bennett et al. ................ 701/22 |
| 2008/0060613 A1* | 3/2008 | Bauerle et al. .............. 123/399 |
| 2008/0146408 A1* | 6/2008 | Tabata et al. .................. 477/35 |
| 2009/0164082 A1* | 6/2009 | Kobayashi et al. ........... 701/94 |
| 2010/0214085 A1* | 8/2010 | Avery et al. ................. 340/435 |
| 2011/0012753 A1* | 1/2011 | Shrum, Jr. ................... 340/902 |
| 2011/0100326 A1* | 5/2011 | Yoshida et al. .............. 123/337 |

FOREIGN PATENT DOCUMENTS

| | | |
|---|---|---|
| CN | 10114434 A | 3/2008 |
| CN | 101287634 A | 10/2008 |
| DE | 195 06 364 | 8/1995 |
| EP | 2 072 317 A2 | 6/2009 |
| EP | 2 163 449 A2 | 3/2010 |
| JP | 2005-080523 A | 3/2005 |

* cited by examiner

*Primary Examiner* — Redhwan k Mawari
*Assistant Examiner* — Rodney P King
(74) *Attorney, Agent, or Firm* — Norton Rose Fulbright US LLP

(57) ABSTRACT

In a method for engine torque adjustment of a propulsion engine in a vehicle, the vehicle surroundings are monitored with the aid of surroundings sensors, the actual engine torque being reduced with regard to the torque intended by the driver when an obstacle is recognized.

20 Claims, 1 Drawing Sheet

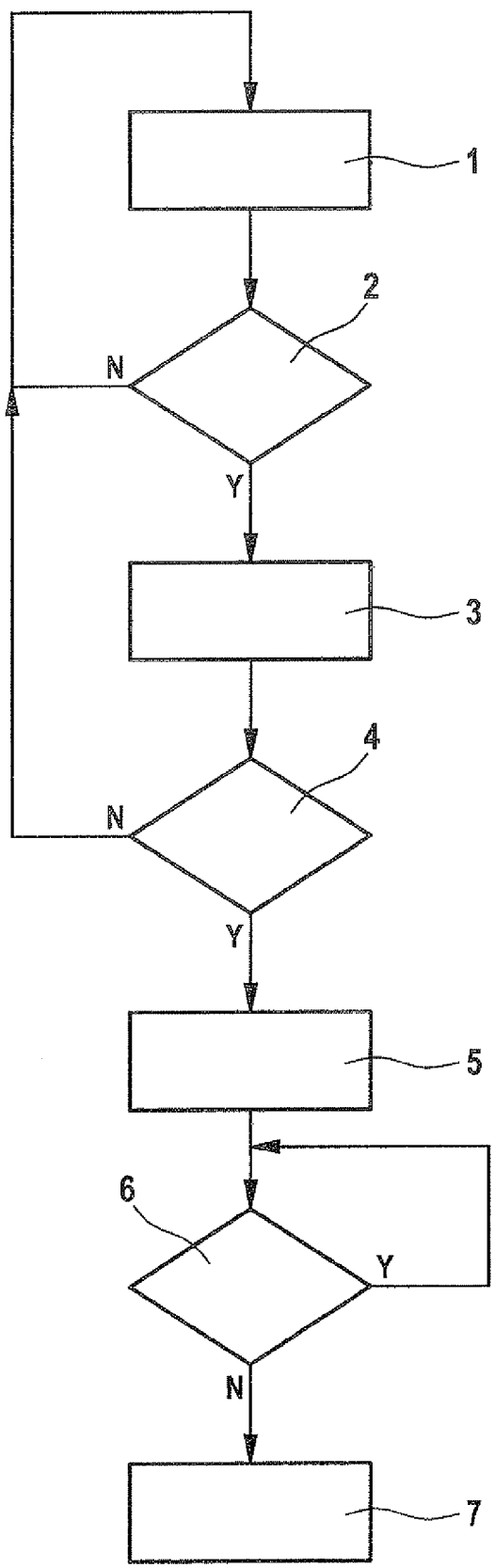

METHOD FOR ENGINE TORQUE ADJUSTMENT

RELATED APPLICATION INFORMATION

The present application claims priority to and the benefit of German patent application No. 10 2011 079 149.3, which was filed in Germany on Jul. 14, 2011, the disclosure of which is incorporated herein by reference.

FIELD OF THE INVENTION

The present invention relates to a method for adjusting the engine torque of a propulsion engine in a vehicle.

BACKGROUND INFORMATION

German patent document DE 195 06 364 C2 discusses a vehicle control system in which the instantaneous vehicle position is determined with the aid of a navigation device, and the vehicle state is changed as a function of the vehicle position by influencing the braking system and the steering system of the vehicle. To be able to negotiate a turn more safely, for example, the vehicle speed is reduced upon recognition of an approaching turn by activating the braking system, and the vehicle is driven in a controlled manner through the turn by acting upon the steering system. The information obtained from the navigation device is used to generate setpoint inputs for the control systems in the braking system and the steering system.

SUMMARY OF THE INVENTION

An object of the exemplary embodiments and/or exemplary methods of the present invention is to increase the vehicle safety if an obstacle is recognized in the vehicle surroundings.

This object may be achieved according to the exemplary embodiments and/or exemplary methods of the present invention by the features described herein. The further descriptions herein specify advantageous refinements.

With the aid of the method according to the present invention, the engine torque of a propulsion engine in a vehicle may be adjusted to increase the vehicle safety. The engine torque is modified when an obstacle is recognized via surroundings sensors in the vehicle using which the vehicle surroundings are monitored. In this case, the actual engine torque of the propulsion engine is reduced with regard to the intended torque predefined by the driver, both a reduction in the sense of a delimitation of a maximally output engine torque and a reduction in the sense of a delimited increase in the engine torque characteristic being considered. The delimitation takes place either directly through a direct intervention in the engine torque or indirectly through an intervention in a state variable which influences the engine torque, for example the longitudinal acceleration of the vehicle.

The level and increase of the engine torque may be delimited either alternatively or cumulatively. This results in the advantage that the accelerator pedal operations executed by the driver are not implemented directly as compared to systems without drive torque delimitation, but rather lead to a torque increase in a reduced manner depending on the type of delimitation. The delimitation of the engine torque results in a slower speed build-up so that in the case of a collision, personal or property damage may be significantly reduced or possibly even prevented. Panic reactions of the driver are mitigated so that an accidentally too vigorous operation of the accelerator pedal only leads to a reduced vehicle acceleration. In vehicles having a manual gear shift, abrupt operations of the clutch pedal or a slipping off the clutch pedal may result in a great engine torque increase, which may be mitigated with the aid of the method according to the present invention.

The method is advantageously used below a speed limiting value. Therefore, its use is considered for situations carried out manually involving parking and pulling out of a parking spot which are characterized, on the one hand, by a small distance between the vehicle and the obstacles situated in immediate proximity of the vehicle and, on the other hand, by high activity when pedals, the steering system, and the transmission are operated by the driver, which bears the risk of human error. Moreover, there is the risk of a person, a vehicle, or an object getting into the traffic lane of the vehicle during the maneuvering process. By reducing the engine torque, parking situations involving accidental engagement of the wrong gear (forward motion instead of reverse motion and vice versa) or excessive acceleration by the driver (excessive operation of the accelerator pedal or slipping off the clutch pedal) are defused.

The method is advantageously used below the speed limiting value. If the vehicle speed exceeds the limiting value, the delimitation of the drive torque is discontinued according to a first embodiment variant. In another embodiment variant, it may also be advantageous to also allow the drive torque to be reduced above the speed limiting value in the case of a recognized obstacle in the vehicle surroundings, different limiting values being used for the engine torque, if necessary. It is also possible to carry out the reduction of the drive torque independent from the speed, i.e., without delimitation to a speed limiting value.

The delimitation of the drive torque may also depend on different vehicle state variables or information on the surroundings with regard to the level and/or the gradient. For example, a dependency on the distance between the vehicle and the recognized obstacle is considered in such a way that the drive torque is reduced as the distance reduces.

To influence the engine torque, a parameter of a driver assistance system, e.g., an electronic stability program (ESP), via which the engine torque may be influenced is modified, for example. Additionally or alternatively, a setpoint input for a control system in a regulating or control unit or in a driver assistance system may also be modified to reduce the engine torque.

The information on the surroundings is ascertained from on board surroundings sensors. Sensors such as ultrasound-, radar-, lidar-based sensors, and/or optical sensors or information obtained from a video are considered. Information of an on board navigation device may also be used. It might also be possible to use information on the surroundings which is ascertained outside the vehicle, from another vehicle, for example, the information on the surroundings being transmitted via vehicle-to-vehicle communication.

According to another advantageous embodiment, the delimitation of the engine torque is discontinued again when certain preconditions apply. For example, the engine torque may be increased again to its original values if the obstacle is no longer relevant. A time controlled characteristic of the engine torque, during which the engine torque is increased again in a time-controlled manner, is also possible. Moreover, an increase via a filter is also considered. For the case that the vehicle speed is below a limiting value, the increased engine torque may be necessary in certain situations, for example when towing the vehicle.

The method runs in the vehicle in a regulating or control unit which may be an integral part of a driver assistance system, e.g., of an electronic stability program ESP.

Additional advantages and advantageous embodiments are derived from the other claims, the description of the figures, and the drawing.

BRIEF DESCRIPTION OF THE DRAWINGS

The FIGURE shows a flow chart including the individual method steps for carrying out the method for engine torque adjustment.

DETAILED DESCRIPTION

First method step 1 marks the start of the method for engine torque adjustment of the propulsion engine in a vehicle; in the exemplary embodiment, the delimitation of the engine torque is limited to situations involving parking and pulling out of a parking spot in which the vehicle speed is below a speed limiting value. The checking of the vehicle speed takes place in subsequent method step 2. The value of the instantaneous vehicle speed, which is compared to a predefined speed limiting value, is available via the on board sensors. If the instantaneous vehicle speed is below the speed limiting value, the Yes branch ("Y") is followed to next method step 3. If, however, the instantaneous vehicle speed is above the speed limiting value, the No branch ("N") is followed back to the start of the method according to step 1, and the entire method is carried out again at cyclic intervals.

In method step 3, information on the surroundings is generated with the aid of on board surroundings sensors including radar sensors for greater distances and ultrasound sensors for smaller distances, for example. Other sensor types such as lidar sensors or video-based information which are suitable for detecting obstacles in the vehicle surroundings are fundamentally also considered.

In subsequent method step 4, a query is made as to whether the distance between the vehicle and an obstacle recognized in the vehicle surroundings, for example another vehicle, falls below an admissible limiting value. If this is not the case, the instantaneous distance between the vehicle and the obstacle is above the limiting value and thus large enough to not require torque-limiting measures; in this case, the No branch is followed back to the start of the method according to step 1. If, however, the distance falls below the admissible limiting value, the vehicle is in the immediate proximity of the obstacle and the process follows the Yes branch to subsequent method step 5 in which the delimitation of the actual engine torque of the propulsion engine is carried out with regard to the torque intended by the driver. The delimitation may apply to both the absolute highest level of the engine torque and the increase or gradient in the engine torque characteristic. In general, an alternative and also a cumulative delimitation of the level and gradient of the drive torque are considered.

In subsequent method step 6, a time sequence is stored which is to ensure that the delimitation of the engine torque is discontinued after a defined time limit has elapsed. If the elapsed time since the start of the delimitation of the engine torque is still within the time limit, the Yes branch is followed back to the start of method step 6 and the checking for exceeding the time limit is carried out again at cyclic intervals; the delimitation of the engine torque continues within the time limit. If the elapsed time is no longer within the time limit, the No branch is followed to subsequent method step 7 in which the delimitation of the engine torque is discontinued with regard to the level and/or the gradient. This is the end of the method.

What is claimed is:

1. A method for providing drive torque adjustment in a vehicle when parking or exiting a parking spot, the method comprising:
    monitoring a vehicle's surroundings via surroundings sensors;
    determining a speed of the vehicle;
    detecting an obstacle in the vehicle's surroundings;
    determining a distance between the vehicle and the detected obstacle;
    reducing an actual drive torque of the vehicle with regard to a drive torque intended by the driver conditional upon that the vehicle speed is below a first threshold value and the determined distance between the vehicle and the detected obstacle is below a second threshold value; and
    discontinuing the reducing of the drive torque if the vehicle speed rises above the first threshold value.

2. The method of claim 1, wherein the reducing of the drive torque includes modifying at least one parameter, which influences engine torque of a driver assistance system.

3. The method of claim 2, wherein information from on board sensors, which ascertain the vehicle state variables, is additionally taken into account when setting the at least one parameter.

4. The method of claim 1, wherein the reducing of the drive torque includes reducing engine torque by modifying a setpoint input for a control system.

5. The method of claim 1, wherein information on the surroundings from at least one of ultrasound, radar, lidar, and video are taken into account.

6. The method of claim 1, further comprising discontinuing the reducing of the drive torque if the obstacle is no longer relevant.

7. The method of claim 1, further comprising discontinuing the reducing of the drive torque in a time-controlled manner.

8. The method of claim 1, wherein the reducing arrangement modifies at least one parameter, which influences engine torque of a driver assistance system, which is an electronic stability program (ESP) system.

9. The method of claim 1, wherein the reducing of the drive torque includes reducing engine torque by reducing a maximum level of the engine torque.

10. The method of claim 1, wherein the reducing of the drive torque includes reducing engine torque by reducing an amount of change in the engine torque.

11. The method of claim 1, wherein the drive torque is reduced by an amount that depends on the determined distance between the vehicle and the detected obstacle.

12. The method of claim 1, wherein the monitoring of the vehicle's surroundings includes receiving information transmitted from another vehicle.

13. The method of claim 1, further comprising:
    storing a time when the reducing of the drive torque begins; and
    discontinuing the reducing of the drive torque after a predefined time elapses after the time when the reducing of the drive torque begins.

14. The method of claim 1, further comprising determining a speed of the vehicle, wherein the reducing of the drive torque is carried out using a first engine torque limiting value if the vehicle speed is below a speed threshold value and using a second engine torque limiting value if the vehicle speed is above the speed threshold value.

15. The method of claim 1, wherein the reducing of the drive torque includes reducing a maximum level of engine torque and reducing an amount of change in the engine torque.

16. The method of claim 1, wherein the reducing of the actual drive torque of the vehicle with regard to a drive torque intended by the driver is performed by reducing an actual engine torque of a propulsion engine with regard to an engine torque intended by the driver.

17. A regulating/control unit for providing drive torque adjustment in a vehicle when parking or exiting a parking spot, comprising:
- a monitoring arrangement to monitor a vehicle's surroundings via surroundings sensors;
- a determining arrangement to determine a speed of the vehicle;
- a detecting arrangement to detect an obstacle in the vehicle's surroundings;
- a determining arrangement to determine a distance between the vehicle and the detected obstacle;
- a reducing arrangement to reduce an actual drive torque of the vehicle with regard to a drive torque intended by the driver conditional upon that the vehicle speed is below a first threshold value and the determined distance between the vehicle and the detected obstacle is below a second threshold value; and
- a discontinuing arrangement to discontinue the reducing of the drive torque if the vehicle speed rises above the first threshold value.

18. The regulating/control unit of claim 17, wherein the reducing of the actual drive torque of the vehicle with regard to a drive torque intended by the driver is performed by reducing an actual engine torque of a propulsion engine with regard to an engine torque intended by the driver.

19. A driver assistance system, which includes an on board electronic stability program (ESP), comprising:
- a regulating/control unit for providing drive torque adjustment in a vehicle when parking or exiting a parking spot, including:
  - a monitoring arrangement to monitor a vehicle's surroundings via surroundings sensors;
  - a determining arrangement to determine a speed of the vehicle;
  - a detecting arrangement to detect an obstacle in the vehicle's surroundings;
  - a determining arrangement to determine a distance between the vehicle and the detected obstacle;
  - a reducing arrangement to reduce an actual drive torque of the vehicle with regard to a drive torque intended by the driver conditional upon that the vehicle speed is below a first threshold value and the determined distance between the vehicle and the detected obstacle is below a second threshold value; and
  - a discontinuing arrangement to discontinue the reducing of the drive torque if the vehicle speed rises above the first threshold value.

20. The driver assistance system of claim 19, wherein the reducing of the actual drive torque of the vehicle with regard to a drive torque intended by the driver is performed by reducing an actual engine torque of a propulsion engine with regard to an engine torque intended by the driver.

\* \* \* \* \*